United States Patent
Wu et al.

(10) Patent No.: US 12,444,062 B2
(45) Date of Patent: Oct. 14, 2025

(54) VISUAL QUESTION GENERATION WITH ANSWER-AWARENESS AND REGION-REFERENCE

(71) Applicant: INTERNATIONAL BUSINESS MACHINES CORPORATION, Armonk, NY (US)

(72) Inventors: Lingfei Wu, Elmsford, NY (US); Lei Yu, Sleepy Hollow, NY (US); Chen Wang, Chappaqua, NY (US); Dakuo Wang, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 791 days.

(21) Appl. No.: 17/163,268

(22) Filed: Jan. 29, 2021

(65) Prior Publication Data

US 2022/0245838 A1    Aug. 4, 2022

(51) Int. Cl.
| | |
|---|---|
| G06F 40/40 | (2020.01) |
| G06F 18/20 | (2023.01) |
| G06F 40/289 | (2020.01) |
| G06N 3/045 | (2023.01) |
| G06N 20/00 | (2019.01) |
| G06T 7/33 | (2017.01) |
| G09B 7/02 | (2006.01) |

(52) U.S. Cl.
CPC ............... *G06T 7/33* (2017.01); *G06F 18/29* (2023.01); *G06F 40/289* (2020.01); *G06F 40/40* (2020.01); *G06N 3/045* (2023.01); *G06N 20/00* (2019.01); *G09B 7/02* (2013.01)

(58) Field of Classification Search
CPC . G06T 7/33; G06T 11/60; G06F 18/29; G06F 40/289; G06F 40/40; G06F 40/35; G06F 40/56; G06N 3/045; G06N 20/00; G06N 5/02; G06N 20/10; G09B 7/02; G06V 10/82
See application file for complete search history.

(56) References Cited

U.S. PATENT DOCUMENTS

| | | |
|---|---|---|
| 9,965,705 B2 | 5/2018 | Chen et al. |
| 10,410,351 B2 | 9/2019 | Lin et al. |
| | (Continued) | |

OTHER PUBLICATIONS

Xu, Xing, et al. "Radial graph convolutional network for visual question generation." IEEE transactions on neural networks and learning systems 32.4 (2020): 1654-1667.https:/ieeexplore.ieee.org/abstract/document/9079208 (Year: 2020).*

(Continued)

*Primary Examiner* — Aaron W Carter
*Assistant Examiner* — Han Hoang
(74) *Attorney, Agent, or Firm* — Intelletek Law Group, PLLC; Gabriel Daniel, Esq.

(57) ABSTRACT

A computer-implemented method for visual question generation includes training an alignment module to analyze an image, an answer hint, and a visual hint with respect to the image. A k-nearest neighbors (KNN) graph is constructed by performing an aligned embedding for each region of the image. A node embedding component is generated by using a graph embedding component of the KNN graph. A visual question is generated by sequence decoding each image and graph of the image.

19 Claims, 13 Drawing Sheets

(56) References Cited

U.S. PATENT DOCUMENTS

| | | | |
|---|---|---|---|
| 10,592,767 | B2 | 3/2020 | Trott et al. |
| 10,726,062 | B2 | 7/2020 | Zheng et al. |
| 10,726,206 | B2 | 7/2020 | Sigal et al. |
| 10,754,851 | B2 | 8/2020 | Cohen et al. |
| 11,328,616 | B2 * | 5/2022 | Tsyrina ................... G06F 3/167 |
| 2006/0240810 | A1 | 10/2006 | Chang et al. |
| 2016/0342895 | A1 | 11/2016 | Gao et al. |
| 2018/0365856 | A1 | 12/2018 | Parasnis et al. |
| 2019/0370587 | A1 | 12/2019 | Burachas et al. |
| 2020/0104638 | A1 | 4/2020 | Huang et al. |
| 2020/0193228 | A1 | 6/2020 | Lu et al. |
| 2020/0293921 | A1 | 9/2020 | Huang et al. |

OTHER PUBLICATIONS

Chen, Yu, Lingfei Wu, and Mohammed J. Zaki. "Reinforcement learning based graph-to-sequence model for natural question generation." arXiv preprint arXiv:1908.04942 (2019).https://arxiv.org/abs/1908.04942 (Year: 2019).*

Schroeder, Brigit, Subarna Tripathi, and Hanlin Tang. "Triplet-aware scene graph embeddings." Proceedings of the IEEE/CVF International Conference on Computer Vision Workshops. 2019. https://openaccess.thecvf.com/content_ICCVW_2019/html/SGRL/Schroeder_TripletAware_Scene_Graph_Embeddings_ICCVW_2019_pape (Year: 2019).*

Alipour, Kamran, et al. "A study on multimodal and interactive explanations for visual question answering." arXiv preprint arXiv:2003.00431 (2020).https://arxiv.org/abs/2003.00431 (Year: 2020).*

Karpathy, Andrej, and Li Fei-Fei. "Deep visual-semantic alignments for generating image descriptions." Proceedings of the IEEE conference on computer vision and pattern recognition. 2015.https://www.cvfoundation.org/openaccess/content_cvpr_2015/html/Karpathy_Deep_Visual-Semantic_Alignments_2015_CVPR_p (Year: 2015).*

Krishna, Ranjay, et al. "Visual genome: Connecting language and vision using crowdsourced dense image annotations." International journal of computer vision 123 (2017): 32-73.https://link.springer.com/article/10.1007/S11263-016-0981-7 (Year: 2017).*

Mell, P. et al., "Recommendations of the National Institute of Standards and Technology"; NIST Special Publication 800-145 (2011); 7 pgs.

Anonymous, "Ask Question With Double Hints: Visual Question Generation With Answer-Awareness and Region-Reference", ICLR Conference Paper, pp. 1-15, Oct. 2, 2020.

Guo, D. et al.; "Dual Visual Attention Network for Visual Dialog", IJCAI-19 28th International Joint Conference On, pp. 4989-4995, Aug. 10-16, 2019.

Wu, J. et al.; "Self-Critical Reasoning for Robust Visual Question Answering", NeurIPS 2019 Conference On, pp. 1-11, May 24, 2019.

Guo, D. et al.; "Iterative Context-Aware Graph Inference for Visual Dialog", CVPR IEEE/CVF Conference On, pp. 10055-10064, Jun. 13-19, 2020.

Li, Y. et al.; "Learning to Disambiguate By Asking Discriminative Questions", Cornell University Library, arXiv:1708.02760v1, pp. 1-14, Aug. 9, 2017.

Krishna, R. et al., "Information Maximizing Visual Question Generation", arXiv:1903.11207v1 [cs.CV] (2019), 11 pgs.

Liu, F. et al., "iVQA: Inverse Visual Question Answering", arXiv:1710.03370v2 [cs.CV] (2018), 9 pgs.

Li, Y. et al., "Visual question generation as dual task of visual question answering", arXiv:1709.07192v1 [cs.CV] (2017), 9 pgs.

* cited by examiner

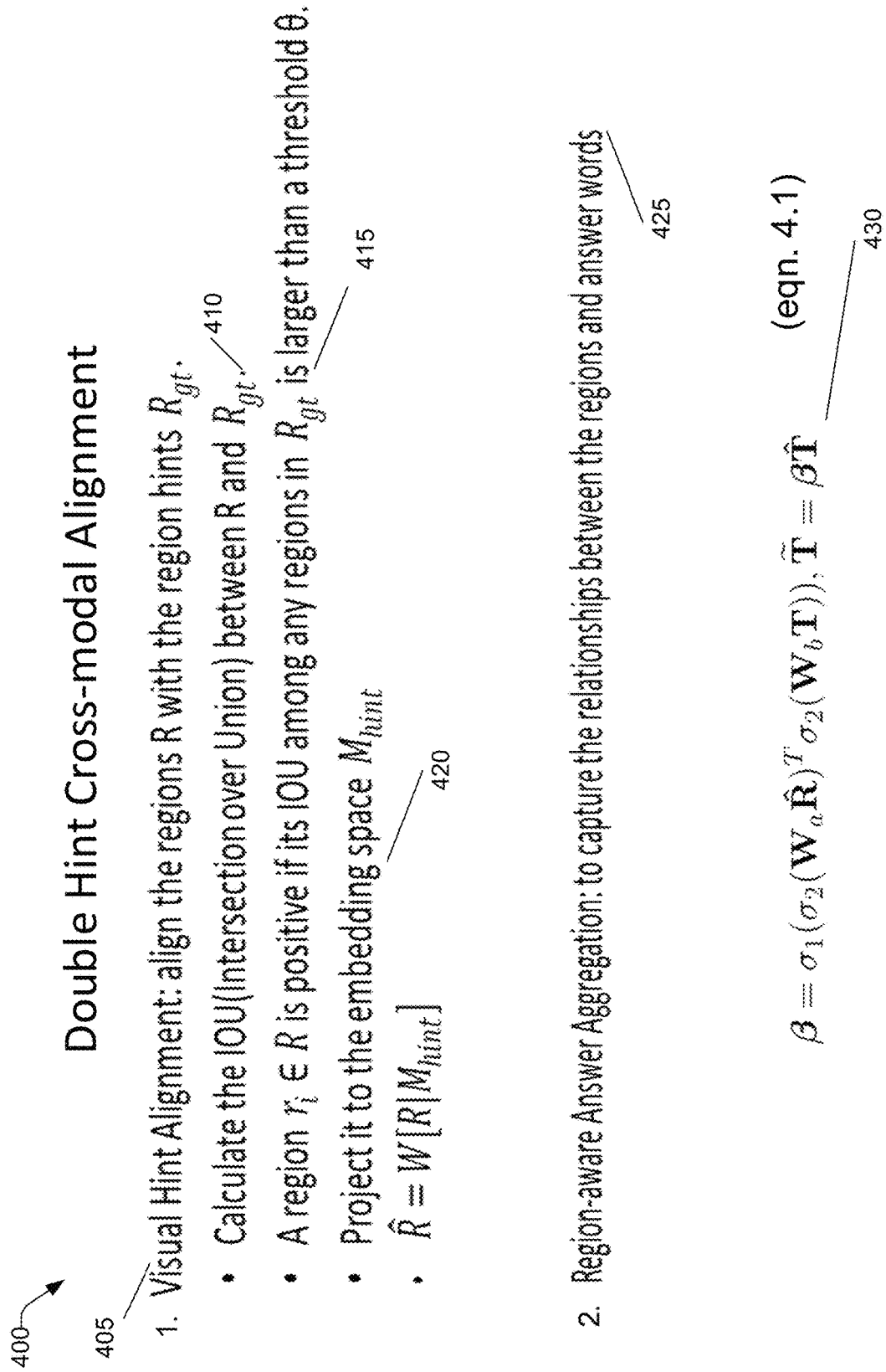

Double Hint Cross-modal Alignment

1. Visual Hint Alignment: align the regions R with the region hints $R_{gt}$.
   - Calculate the IOU (Intersection over Union) between R and $R_{gt}$.
   - A region $r_i \in R$ is positive if its IOU among any regions in $R_{gt}$ is larger than a threshold $\theta$.
   - Project it to the embedding space $M_{hint}$.
     $$\hat{R} = W[R|M_{hint}]$$

2. Region-aware Answer Aggregation: to capture the relationships between the regions and answer words
   $$\beta = \sigma_1(\sigma_2(\mathbf{W}_a\hat{\mathbf{R}})^T \sigma_2(\mathbf{W}_b\mathbf{T})), \tilde{\mathbf{T}} = \beta\hat{\mathbf{T}} \quad \text{(eqn. 4.1)}$$

FIG. 4

Double Hint Cross-modal Alignment

3. Answer-aware Gate: to weaken the answer-irrelevant regions.

$$g = \sigma(W_g \widetilde{T} + b_g), \widetilde{R} = \hat{R} \odot g \quad \text{(eqn. 5.1)}$$

4. Cross-modal Fusion: we will fuse the visual region features with the answer features and project them to one embedding space $$X = \textit{Align}(\hat{R}, T) = W_x[\widetilde{R}|\widetilde{T}] + B_x \quad \text{(eqn. 5.2)}$$

FIG. 5

Double Hint Guided Graph Learning

- 1. Graph Topology Construction: KNN-graph or similar using learned aligned region embeddings

- 2. Feature aggregation using GNNs

GCN Formula:

$$X^{out} = \frac{\sigma(D^{-1/2}AD^{-1/2}X^{in}W) + X^{in}}{\sqrt{2}}$$

Stack K basic module:
$$X^{out} = \frac{GCN(X^{in}) + X^{in}}{\sqrt{2}}$$

$$X^{out} = Laynorm(X^{out})$$

FIG. 6

Experiment

Pre-processing — 710

1. Generate objects $R_{DET}$ with their classes in the image using the detection model. — 720
2. Use natural language processing tools to find the noun-phrase in both questions and answers. — 730
3. Align them with the objects' class.
4. Two special cases which can lead to no aligned objects: (1) the error caused by the detection model or the NLP tools. Solution: drop (2) there are exactly no region hints (e.g., Q: Is there any book? A: No). Solution: keep

| Method | DIST-2-gram | DIST-3-gram |
|---|---|---|
| IMVQG | 0.753 | 0.764 |
| Dual | 0.729 | 0.753 |
| Ours | 0.847 | 0.852 |
| Ground Truth | 0.944 | 0.98 |

Table 3 Diversity Results on VQA2.0 val set.

FIG. 8

VISUAL QUESTION GENERATION WITH ANSWER-AWARENESS AND REGION-REFERENCE

STATEMENT REGARDING PRIOR DISCLOSURES BY THE INVENTOR OR A JOINT INVENTOR

Wu, L et al., "ASK QUESTION WITH DOUBLE HINTS: VISUAL QUESTION GENERATION WITH ANSWER-AWARENESS AND REGION-REFERENCE," Sep. 28, 2020, available at https://openreview.net/pdf?id=WwaX9vKKt.

BACKGROUND

Technical Field

The present disclosure generally relates to computer vision (CV) and natural language processing (NLP), and more particularly, to visual question generation (VQG) to generate from an image human-like questions and other side information.

Description of the Related Art

The goal of Visual question generation (VQG) is to generate human-like questions based on a given image, as well as side information (e.g., an answer type or the answer itself). VQG is increasing in popularity for a number of reasons that include a way to provide high-quality synthetic training data for visual question answering (VQA) and a visual dialog system.

However, the ability of a VQG to create relevant questions about an image that can be used, for example, as training data for a machine learning system is hampered by non-informative questions and answers regarding an image. The hint that is provided in VQG systems does not serve to guide the VQG to create questions that make efficient and accurate use of such computer devices.

SUMMARY

According to one embodiment, a computer-implemented method for visual question generation includes training an alignment module to analyze an image, an answer hint and a visual hint with respect to the image. A k-nearest neighbors (KNN) graph is constructed by performing an aligned embedding for each region of the image. A node embedding component is generated by using a graph embedding component of the KNN graph, a visual question is generated by sequence decoding each image and graph of the image. Through the use of a double hint (the answer hint and a visual hint), more accurate questions about the image are generated more efficiently. The quality of the training data that includes such visual question generation is increased.

According to an embodiment, the generating of the visual question, the answer hint, and the visual hint is performed using a Graph2Seq model. The Graph2Seq model is used to model the relations of visual and textual hints, and to learn an appropriate embedding used to generate high-quality questions with regard to an image.

According to an embodiment, the method includes applying an image attention to the image and a graph attention to the KNN graph, respectively. The respective application of image attention results in more accurate question generation, as the image and the KNN graph are analyzed separately.

According to an embodiment, the method includes applying by a residual network (ResNet) the image attention and apply the graph attention to the KNN graph by an object detection model using a mask regional convolutional neural network (Mask RCNN). More accurate questions are generated using less computing power than in conventional VQG.

According to an embodiment, the constructing the KNN graph to perform an aligned embedding for each region of the image further includes performing a double hint cross-modal alignment operation to encode a component that is output to an embedding space. The double hint cross-modal alignment operation eliminates non-informative questions that can degrade the overall quality of training data provide to a machine learning model.

According to an embodiment, performing the double hint cross-modal alignment includes performing a visual hint alignment by aligning one or more regions R of the image with one or more region hints $R_{gt}$; calculating an intersection over union between R and $R_{gt}$; determining whether a particular region $r_i$ is positive based on its intersection over union among any region hints $R_{gt}$ being larger than a predetermined threshold θ; and projecting the particular region $r_i$ to an embedding space. More accurate questions and better training data in the form of VQG results.

According to an embodiment, the generating of the visual question further includes generating a side information having an answer to the visual question. The side information can supplement the visual question to provide for a more accurate question generation.

According to an embodiment, the method includes using a natural language processing tool to identify a noun-phrase in the visual question and an answer; and aligning the nounphrase with an object in the image. The use of NLP also improves a quality of the VGQ.

According to an embodiment, a computing device for visual question generation includes: a processor; a memory coupled to the processor, the memory storing instructions to cause the processor to perform acts including training an alignment module to analyze an image, an answer hint, and a visual hint with respect to the image; constructing a k-nearest neighbors (KNN) graph by performing an aligned embedding for each region of the image; generating a node embedding component by using a graph embedding component of the KNN graph; and generating a visual question by sequence decoding each image and graph of the image. Through the use of a double hint (the answer hint and a visual hint), more accurate questions about the image are generated more efficiently. The quality of the training data that is includes such visual question generation is increased.

According to one embodiment, the computing device includes applying an image attention to the image and a graph attention to the KNN graph, respectively.

According to one embodiment, the computing device includes applying by a residual network (ResNet) the image attention, and apply the graph attention to the KNN graph by an object detection model using a mask regional convolutional neural network (Mask RCNN).

According to one embodiment, the computing device includes constructing the KNN graph to perform an aligned embedding for each region of the image further comprises performing a double hint cross-modal alignment operation to encode a component that is output to an embedding space.

According to an embodiment, the computing device includes providing the generated visual question to a machine learning model. The computing device generates higher quality questions that will result in a more accurately trained machine learning model.

According to an embodiment, the computing device includes using feature aggregation to construct the KNN graph. The feature aggregation provides for a more accurate KNN graph.

According to one embodiment, a non-transitory computer-readable storage medium tangibly embodying a computer-readable program code having computer-readable instructions that, when executed, causes a computer device to perform a method for visual question generation, the method including: training an alignment module to analyze an image, an answer hint and a visual hint with respect to the image; constructing a k-nearest neighbors (KNN) graph by performing an aligned embedding for each region of the image; generating a node embedding component by using a graph embedding component of the KNN graph; and generating a visual question by sequence decoding each image and graph of the image. Through the use of a double hint (the answer hint and a visual hint), more accurate questions about the image are generated more efficiently. The quality of the training data that is includes such visual question generation is increased.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIGS. 4 and 5 illustrate a double hint cross-modal alignment operation, consistent with an illustrative embodiment.

FIG. 6 illustrates a double hint guided graph learning operation, consistent with an illustrative embodiment.

FIG. 7 illustrates a pre-processing of an experiment finding a noun-phrase in both questions and answers using natural language processing, consistent with an illustrative embodiment.

FIG. 8 is a table showing diversity results on the VQA value set, consistent with an illustrative embodiment.

DETAILED DESCRIPTION

Overview

Figure 1:
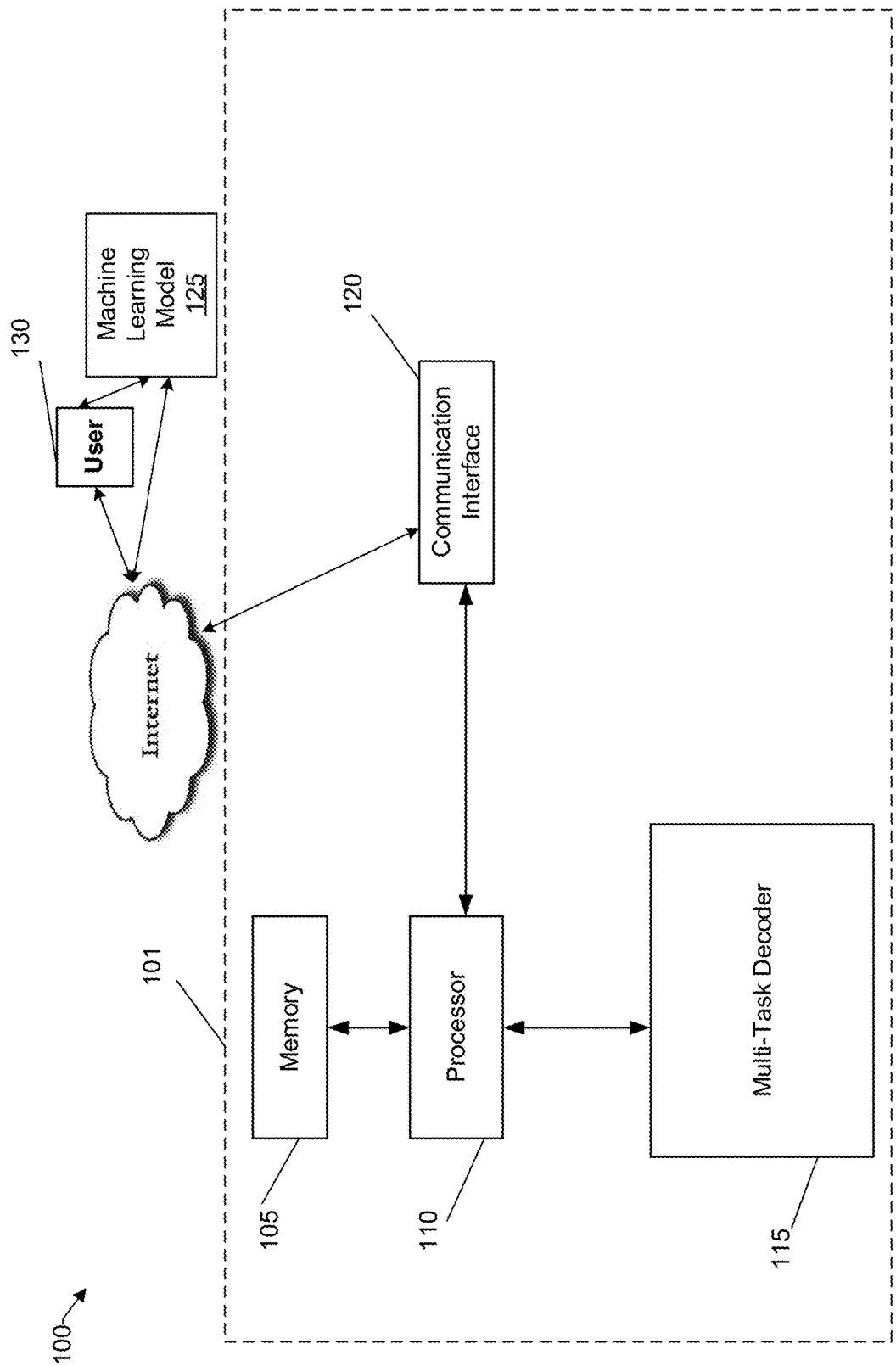
FIG. 1 provides an architectural overview of a system configured for visual question generation, consistent with an illustrative embodiment.

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high-level, without detail, to avoid unnecessarily obscuring aspects of the present teachings.

The term "visual hint" is a collection of visual object regions of interest in an image which are direct visual clues for question generation.

The term "textual hint" are words that are used to identify an object in an image, or an attribute of an image. The textual hint may help identify a region of interest, or a particular object among one or more objects in a region. In the present disclosure, the visual hint and the textual hint are used together as a "double hint" to generate higher-quality questions and answers, which can be used to train a model with better accuracy than, for example, single type or single hint questions.

The term "Graph2Seq" learning is a method of learning that utilizes an encoder-decoder approach with a graph encoder and a sequence decoder. The graph encoder is configured to learn expressive node embeddings, which are reassembled in corresponding graph embeddings. In the present disclosure, a novel cross-modal graph2seq model is used to model the relations of visual and textual hints, and to learn an appropriate embedding used to generate high-quality questions with regard to an image.

The terms "image attention" and "graph attention" are terms that direct a VQG or a computer vision system where to look on a respective image or a graph for pixels or nodes of interest.

The present disclosure proposes a novel learning paradigm to generate visual questions with double hints (e.g., textual answer and visual regions of interest) to provide visual hints and answer hints to be used for the VQG task.

In addition, in an embodiment, the VQG task is explicitly cast as a Graph-to-Sequence (Graph2Seq) learning problem. A graph learning technique is employed to learn implicit graph topology to capture various rich interactions between and within an image, and then utilize a Graph2Seq model to guide the question generation with double hints. Accordingly, data sets from experiments are included in the present disclosure which demonstrate that the proposed Graph2Seq model can significantly outperform the existing state-of-the-art by a large margin.

The computer-implemented method and computing device of the present disclosure provides an improvement over current visual question generation (VGQ) systems for a number of reasons. One goal of VGQ systems is to generate human-like questions and answers about images. The generated questions and answers can be used, for example, as training data for a machine learning model. Current VGQ systems suffer from a "one image to many questions" mapping problem that often results in a failure to generate referential and meaningful questions. The result is the generation of non-informative questions with hints that are too short or too broad, and the side information is not informative enough for guiding the question generation process. The generation of non-informative questions results in poor quality of training data, and causes inefficiency in computer operations. The computer-implemented method and computing device of the present disclosure, at least through the use of a double hint process, improves the efficiency of computer operations by reducing unnecessary computerized processing, and the generation of unhelpful information. There is also an improvement in the fields of VGQ, computer vision, and natural language processing, as well as their interaction.

The computer-implemented method and device of the present disclosure also provides for an improvement in computer operation with a novel application and an improvement in the processing of data.

Additional advantages of the computer-implemented method and device of the present disclosure are disclosed herein.

Example Architecture

FIG. 1 provides an architectural overview of a system 100 configured for visual question generation, consistent with an illustrative embodiment. Referring to FIG. 1, a computing device 101 includes a memory 105, a processor 110, and a multitask decoder 115. The memory 105 is configured to store one or more images, and machine executable code to configured the processor 110. The computing device is enabled to communicate with, for example, a machine learning model 125. The machine learning model 123 may communicate directly with the computing device 101, or if both the machine learning model 125 and the computing device 101 are locally arranged, via the communication interface 120. The communication interface 120 can be configured to communicate with the machine learning model 120 and the user 130 over the Internet and/or by wireless protocols such as WiFi. The images stored in the memory 105 may include raw images, as well training images for a computer vision system. The training images (not shown) can include raw images that are processed by the multi-task decoder 115 using visual question generation (VQG) according to the present disclosure.

The machine learning model 125 is not limited to any particular application, and the training images may be directed to any subject that double hints can be used to identify and possibly group images having certain characteristics.

We assume that the raw image is I, and the target answer (answer hint) is a collection of word tokens represented by $X^a = a_1, a_2, \ldots, a_m$, where m denotes the length of the answer. The task of traditional answer-guided VQG is to generate the natural language question comprising a sequence of word tokens $\hat{X}q = q_1, q_2, \ldots, q_n$ which maximizes the conditional likelihood $\hat{X}q = \text{argmax}_{\hat{X}q} P(X^q | I, X^a)$, where n is the number of word tokens. To address the proposed issues, we introduce a new setting that focuses not only on the answer-awareness but also on region-reference. Specifically, the new setting is formulated as a joint optimization over visual hints finding and double-hints guided graph2seq learning tasks. The visual hint is a collection of visual object regions of interest in the image which are direct visual clues for question generation. We denote it as $V = v_1, v_2, \ldots, v_N$, where $v_i$ is the bounding box in the image and N is the number of visual hints. Under this setting, the likelihood can be cast as $P(X^q | I, X^a) = P(X^q | V, I, X^a) P(V | I, X^a)$. In particular, the visual hints will be generated in data pre-processing and the model can learn them without human annotations. Thus there are no visual hints associated with the inference.

Figure 2:
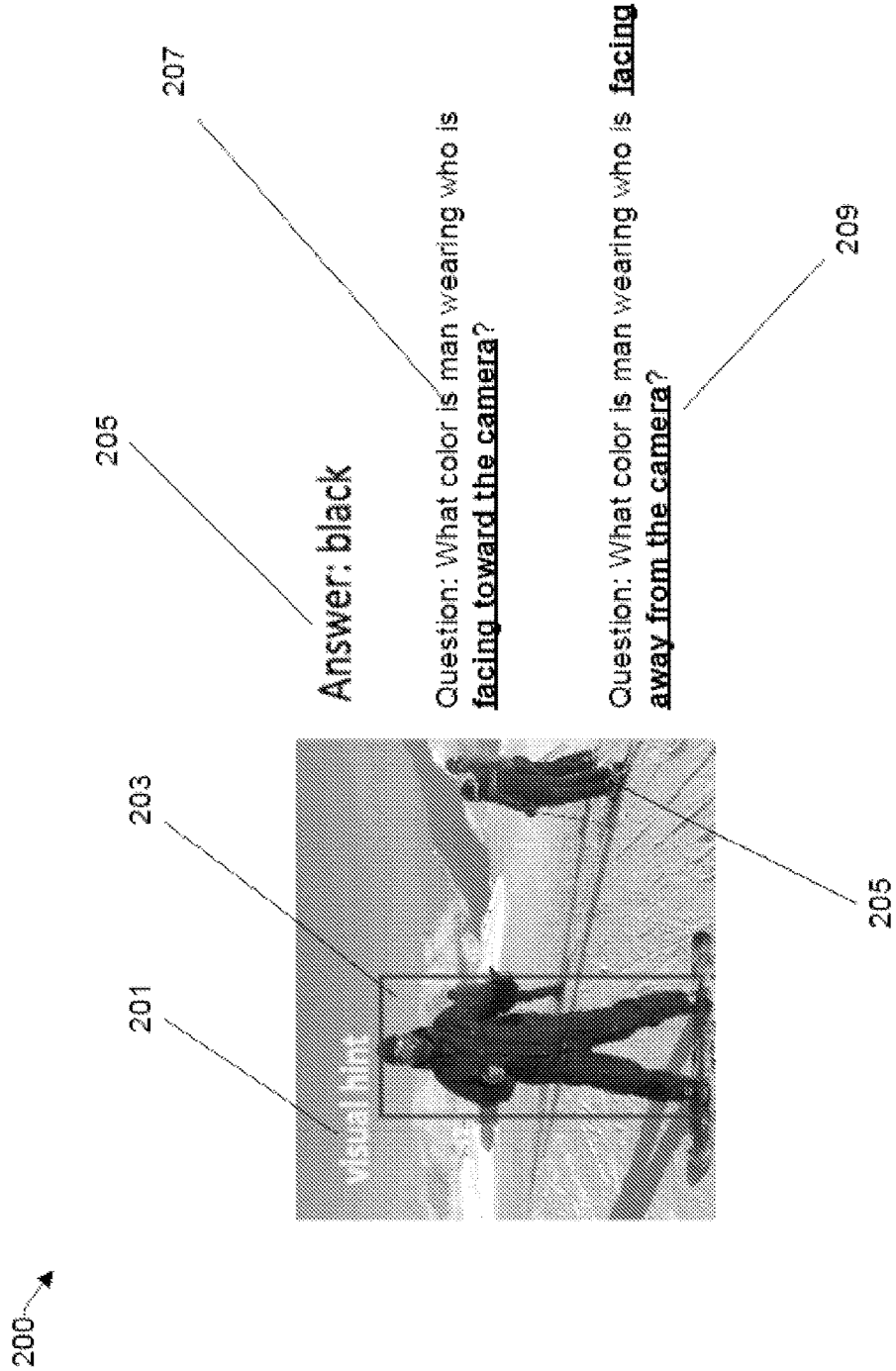
FIG. 2 illustrates an image analyzed using a double hint, consistent with an illustrative embodiment.

FIG. 2 illustrates an image 200 analyzed using a double hint, consistent with an illustrative embodiment. The visual hint 201 includes the first person 203 and the second person 205 is also wearing black. However, the question about what color is the man wearing would be a vague question to ask because the answer could be any of three people in the image. Thus, a second hint, (e.g., in the example a textual hint) can permit more accurate analysis of the image and more accurate questions and answers. In the first question 207, the textual information is "facing toward the camera". In the second question 209 "facing away from the camera" provides a textual hint, that is combined with the visual hint so a more accurate description of the image can be generated in question and answer format. One or more of such image with question and answers generated can be used, for example, to train a model.

Figure 3:
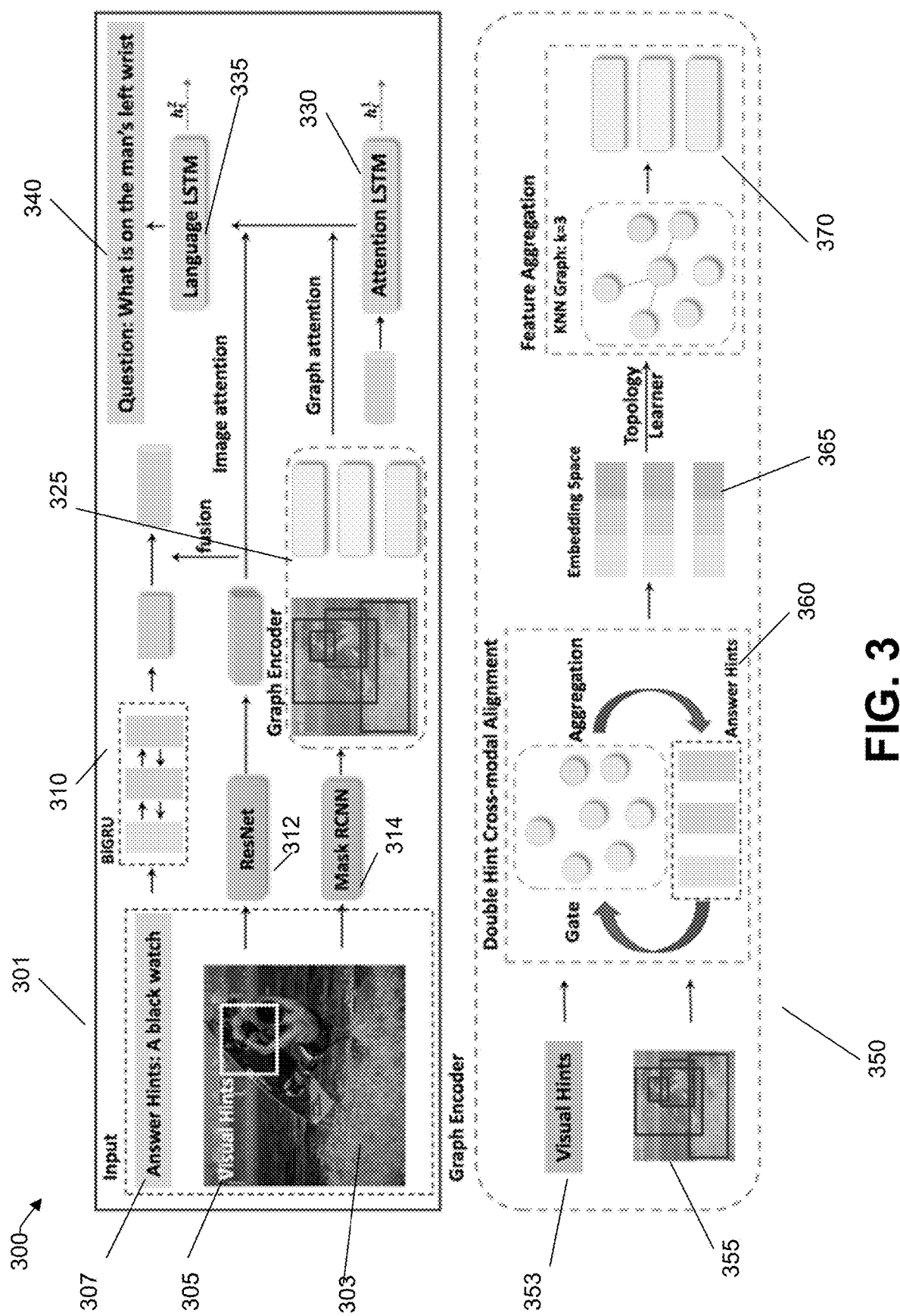
FIG. 3 illustrates a framework of a model with double hints to generate visual questions with answer-awareness and region reference, consistent with an illustrative embodiment.

FIG. 3 illustrates a framework 300 of a model with double hints to generate visual questions with answer-awareness and region reference, consistent with an illustrative embodiment. The model is about to generate questions with key entities that reflect the visual hints and answerable to the answer hints. The double hint guided multi-task auto-encoder 301 learns the visual hints and the unique attributes of visual question generation without introducing human annotations. The framework 300 first models the interactions between visual hints, answer hints, and the image, a graph encoder 325 generates a dynamic graph. A Graph2Seq model generates the questions with double hints. On a decoder side, such as a long-term short-term memory (LSTM) decoder 330, and a visual-hint guided separate attention mechanism attends to the image and the graph separately.

In this illustrative embodiment, the framework 301 shows an input including an image 303, visual hints 305, and an answer hint 307. The input is provided to a bi-directional gated recurrent unit (BIGRU) 310, a residual network (ResNet) 312 that attends to the image, and an object detection model using a mask regional convolutional neural network (Mask RCNN) 314 that attends to the graph. A language LSTM 335 in conjunction with LSTM 330 is used to generate the question 340 "What is on the man's left wrist?" The graph encoder 325 (also shown in an enlarged and more detailed form 350 of the encoder 325 below the framework 301) receives an output of the Mask RCNN 314. In the detailed drawing 350 of the graph encoder 325, it is shown the input of visual hints 353 and the image 355 and performs a double hint cross-modal alignment 360 that is used to generate a k-nearest neighbor (KNN) graph 370. A KNN graph includes which two vertices p and q are connected by an edge, where a distance between p and q is among the k-th smallest distances from p to other objects from P. An embedding space 365 is used store the interactions identified in a double hint cross-modal alignment, as discussed in more detail with reference to FIGS. 4 and 5.

FIGS. 4 and 5 illustrate a double hint cross-modal alignment operation 400, consistent with an illustrative embodiment. A double hint cross-modal alignment is used to infer which regions of interest are suitable subjects for asking questions, and for identifying answer clues and visual object features. To exploit the fine-grained interactions between visual clues and textual answer hints, the explicit modeling of the global correlations between these items is arranged in the embedding space 365 (shown in FIG. 3). In a visual hint alignment operation 405, the regions R are aligned with the region hints $R_{gt}$. An intersection over union (IOU) 410 is calculated between the regions R and hints $R_{gt}$. A particular region ri is determined to be positive if it's IOU among any regions in Rgt is larger than a threshold θ 415. The threshold θ 415 is a hyperparameter that is tunable. At 420, the positive region $r_i$ is projected to the embedding space $M_{hint}$. In a region-aware Answer aggregation, operation 425 is performed to capture the relationships according to the equation (4.1) 430 in FIG. 4 that is reproduced herein:
wherein $$\beta = \sigma_1(\sigma_2(W_a\hat{R})^T\sigma_2(W_bT)), \tilde{T} = \beta\hat{T}$$

Now referring to FIG. 5, the double hint cross-modal alignment operation 500 continues with an answer-aware gate 520 to weaken the answer irrelevant regions, for example, via a gating function g, which passes only part of the information that the regions have. Referring to the equation (5.1) in FIG. 5, $$g = \sigma(W_g\tilde{T}+b_g), \tilde{R} = \hat{R}\odot g,$$

Wg and bg are a parameter matrix and a biased term, respectively. Sigma is the non-linear activation function. $\tilde{T}$ and g are aligned word embedding and gated word embedding. $\tilde{R}$ and $\hat{R}$ are region embedding before and after the operations with the gated word embedding g.

As discussed herein above, one goal of the present disclosure is to reduce non-informative questions and answers so that the VQG is more human-like. Next a cross-modal fusion operation 530 is performed to fuse the visual region features with the answer features and project them to one embedding space. The items in the embedding space are then used to construct a graph, such a KNN graph, by performing feature aggregation using Graphic Neural Networks (GNN). In FIG. 5, equation (5.2) shows an example of a cross-modal fusion operation:

$$X = Align(\tilde{R}, T) = W_x[\tilde{R}|\tilde{T}] + B_x,$$

where Wx and Bx are a parameter matrix and biased term.

In addition, that position and category attributes of objects are used during fine-grained object relation modeling. Thus, the position and category attributes are incorporated by projecting the position vector $p_i$ and category attribute $c_i$ for the object $v_i$ into two embedding spaces (we assume their dimensions are d). Then the position and category attributes are concatenated with visual feature $r_i$. The visual feature $r_i$ is overloaded here considering the conciseness, which means in the following content, $r_i$ $R^{FV}$ ($r_i$ R, $F_V = F_v + 2d$) denotes the object features with position and category embedding.

For each object $r_i$ and answer word $a_j$, we will calculate the alignment score $S_{ij}$ as follows:

$$S_{ij} = \sigma(r_iW_r + a_jW_a)W \quad (1)$$

where $W_r$ $R^{FV \times Falign}$, $W_a$ $R^{Fa \times Falign}$ and W $R^{Falign}$, $F_{align}$ is the hidden dimension size, and σ denotes the Tanh function. Therefore, the alignment score matrix S $R^{N \times m}$ represents the correlations between the objects and the answer words. Then the objects are aligned with an answer according to S.

FIG. 6 illustrates a double hint guided graph learning operation, consistent with an illustrative embodiment. In an NLP domain, graph-to-sequence learning is typically performed to generate sequential results from graph—structured data. However, in the case of non-structured data, such as the regions of an image, a novel cross-modal Graph2Seq model is used to model the relations of the visual and textual hints. With two modal guidance, the model will learn embedding for use in generating higher quality (e.g., more accurate) questions. The graph topology construction 620 in this illustrative embodiment is a KNN-graph or similar using learned aligned region embeddings, such as through the cross-modal alignment previously discussed herein. Feature aggregation 630 is performed using a graphic neural network to create a graph from features in an embedded space. A Graphic convolutional network (GCN) formula 640 and a stack k basic module 650 are performed.

FIG. 7 illustrates a pre-processing of an experiment 700 finding a noun-phrase in both questions and answers using natural language processing, consistent with an illustrative embodiment. In a pre-processing operation 710, objects are generated with their classes using a detection model. NLP tools 720 are then used to find the noun-phrase in both questions and answers, The objects are aligned according to their class 730. There are two cases where no aligned objects may result, an error caused by the detection model or the NLP tools, in which the generated objects should be dropped. In a second case, where there are no exact region hints, the generated objects should be kept.

FIG. 8 is a table showing diversity results on the VQA value set, consistent with an illustrative embodiment. It can be seen in FIG. 8 that there are three different methods including IMVQG 810 by Krishna, a Dual method 820 by Li 2018, and ours 830. It can be seen that our method is closest to the ground truth, showing more diversity than the other methods.

Figure 9:
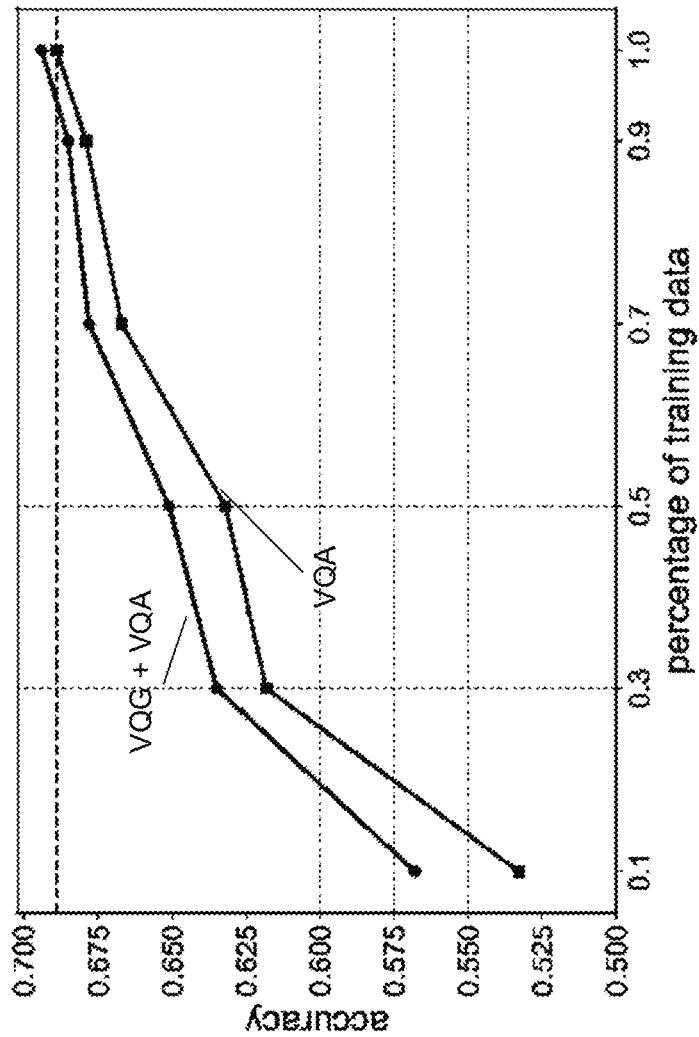
FIG. 9 is a graph showing the accuracy verses a percentage of training data, consistent with an illustrative embodiment.

FIG. 9 is a graph 900 showing the accuracy verses a percentage of training data, consistent with an illustrative embodiment. It can be seen when measuring accuracy versus percentage of training data, the combination of VQG plus VQA is higher than VQA alone. Thus, the VQG helps improve the VQA levels.

Example Process

With the foregoing overview of the example architecture, it may be helpful now to consider a high-level discussion of an example process. To that end, in conjunction with FIGS. 1-9, FIG. 10 depicts a flowchart 1000 illustrating various aspects of a computer-implemented method, consistent with an illustrative embodiment. Process 1000 is illustrated as a collection of blocks, in a logical order, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

Figure 10:
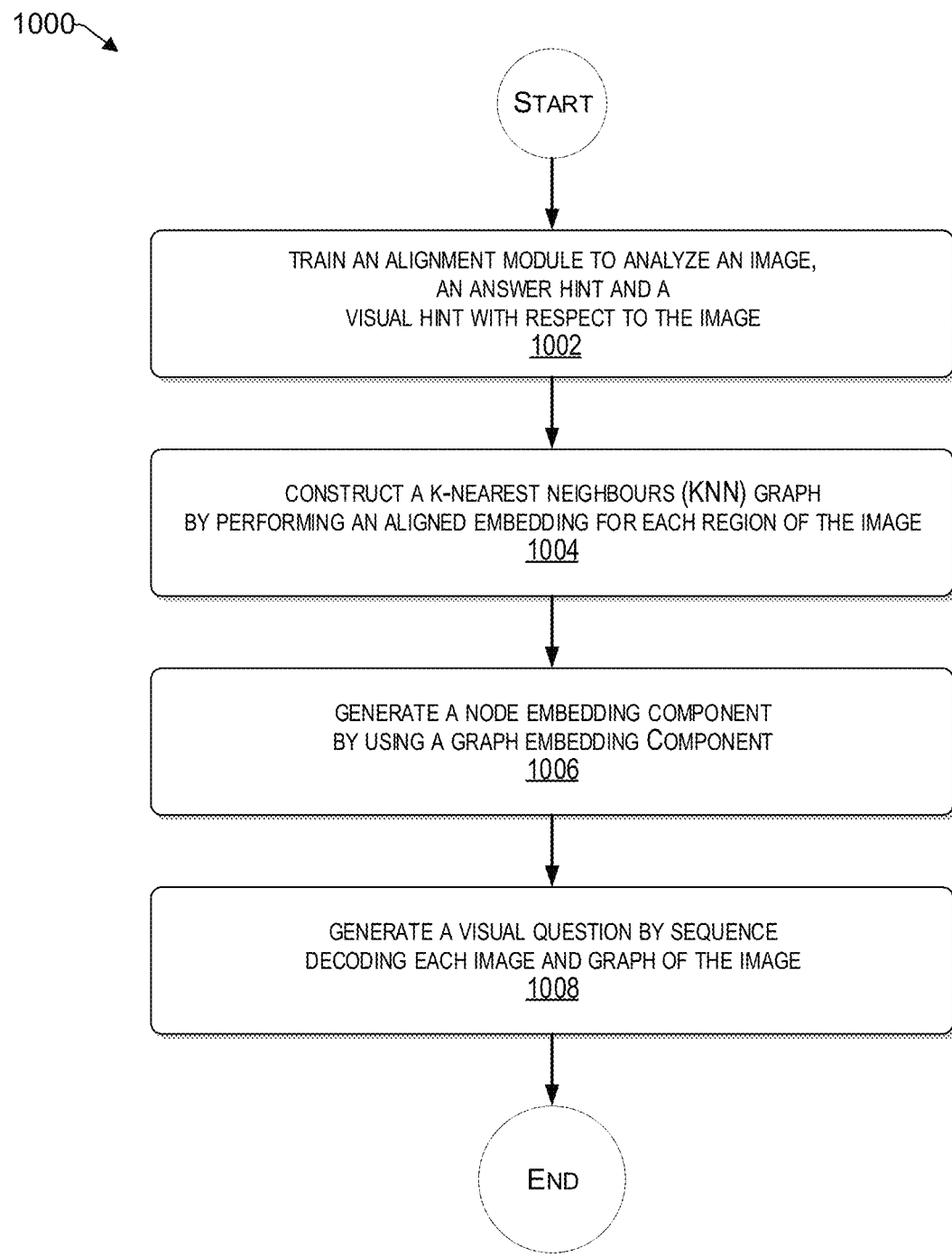
FIG. 10 is a flowchart illustrating a computer-implemented method for visual question generation, consistent with an illustrated embodiment.

Referring now to FIG. 10, at operation 1002, an alignment module is trained to analyze an image, an answer hint, and a visual hint with respect to the image. The dual hints of different type (visual and textual) provide a more diverse guidance in visual question generation than a single hint, or two hints of the same type.

At operation 1004, a K-nearest neighbors (KNN) graph is constructed by performing an aligned embedding for each region of the image. A graphic encoder may be used to fill an embedding space.

At operation 1006, a node embedding component is generated by using a graph embedding component of the KNN graph.

At operation 1008, a visual question is generated by a sequence decoder (such as a multi-task sequence decoder 115 shown in FIG. 1) of each image and a graph of the image. Thus, a more accurate question is generated, and higher quality training data will result.

Example Particularly Configured Computer Hardware Platform

Figure 11:
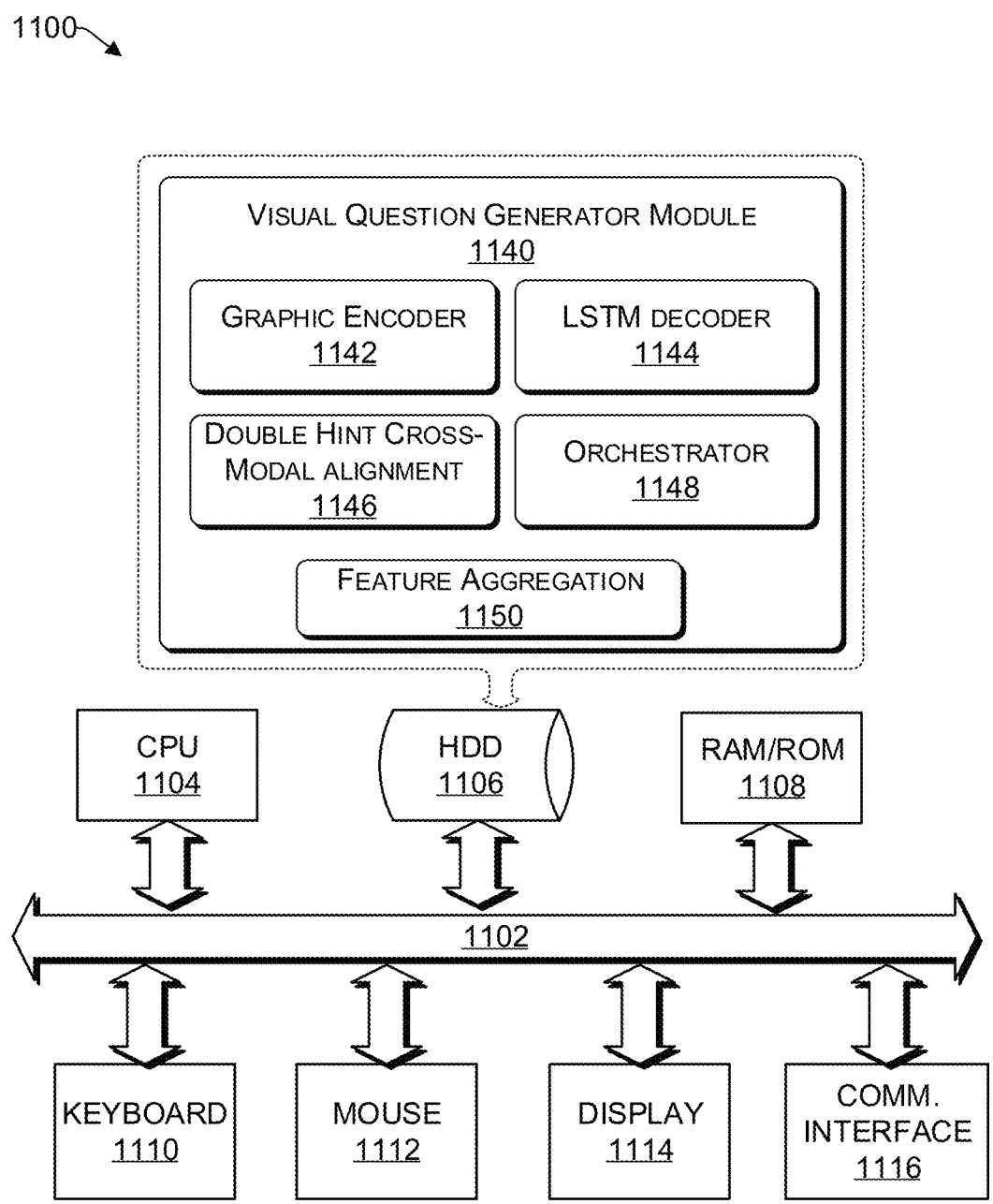
FIG. 11 is a functional block diagram illustration of a computer hardware platform for visual question generation, consistent with an illustrative embodiment.

FIG. 11 provides a functional block diagram illustration 1100 of a computer hardware platform. In particular, FIG. 11 illustrates a particularly configured network or host computer platform 1100, as may be used to implement the methods shown in FIG. 10.

The computer platform 1100 may include a central processing unit (CPU) 1104, a hard disk drive (HDD) 1106, random access memory (RAM) and/or read-only memory (ROM) 1108, a keyboard 1110, a mouse 1112, a display 1114, and a communication interface 1116, which are connected to a system bus 1102. The HDD 1106 can include data stores.

In one embodiment, the HDD 1106, has capabilities that include storing a program that can execute various processes, such as machine learning classification, sampling, meta-learning, selecting, and updating model parameters. The visual Question Generation Module 1140 includes a processor configured to control the overall VQG operation. A graphic encoder 1142 may also fill the embedding space with data generated by the may perform double hint cross-modal alignment module 1146, An LSTM encoder 1144 applies graph attention to the graphical data. A feature aggregation module 1150 will position the nodes on a KNN graph.

Example Cloud Platform

As discussed above, functions relating to the low bandwidth transmission of high definition video data may include a cloud. It is to be understood that although this disclosure includes a detailed description of cloud computing as discussed herein below, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 12:
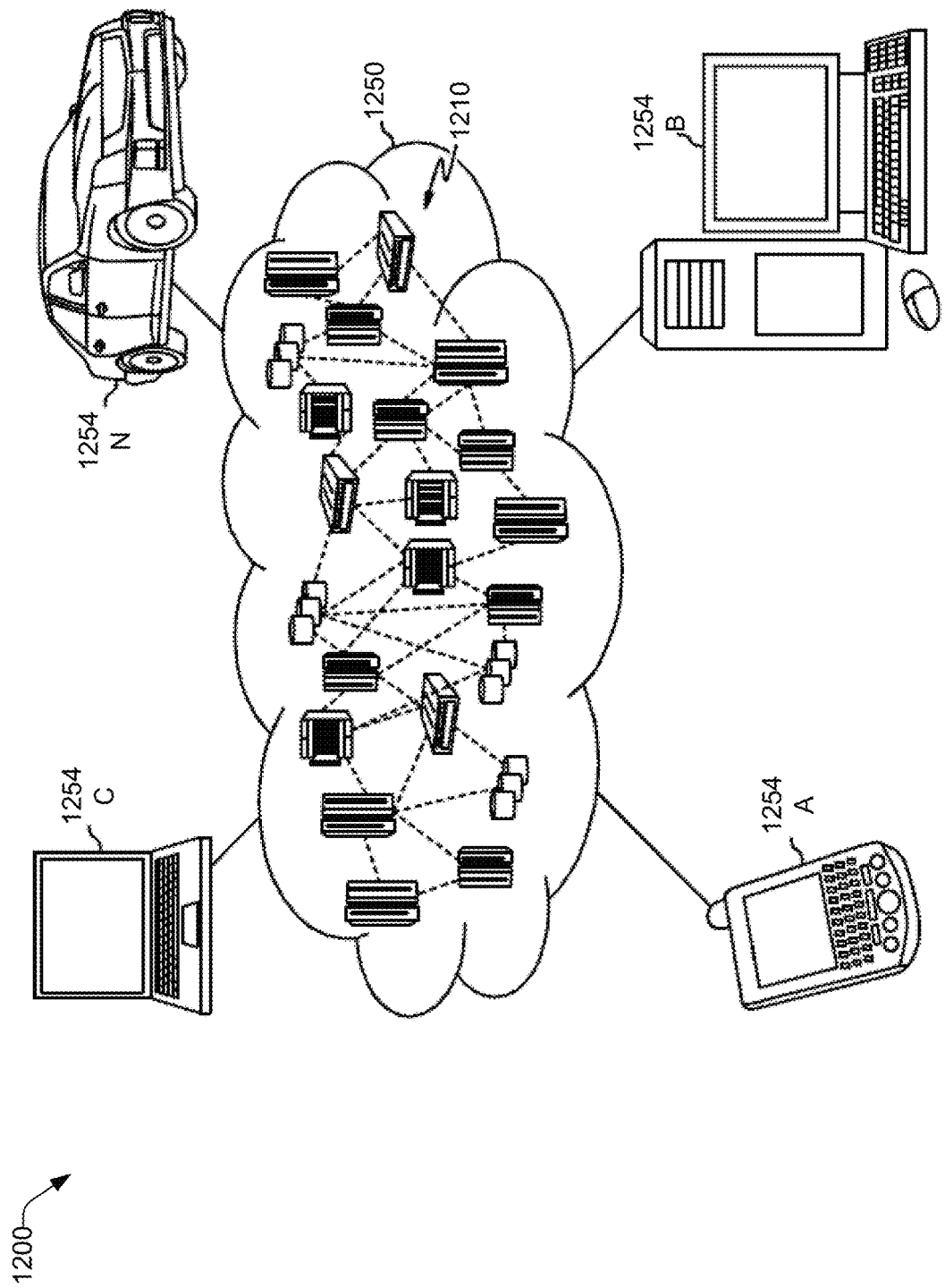
FIG. 12 depicts an illustrative cloud computing environment, consistent with an illustrative embodiment.

Referring now to FIG. 12, an illustrative cloud computing environment 1200 utilizing cloud computing is depicted. As shown, cloud computing environment 1200 includes cloud 1250 having one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1200 to offer infrastructure, platforms, and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1200 can communicate with any type of computerized device over any type of network and/or network addressable connection (e.g., using a web browser).

Figure 13:
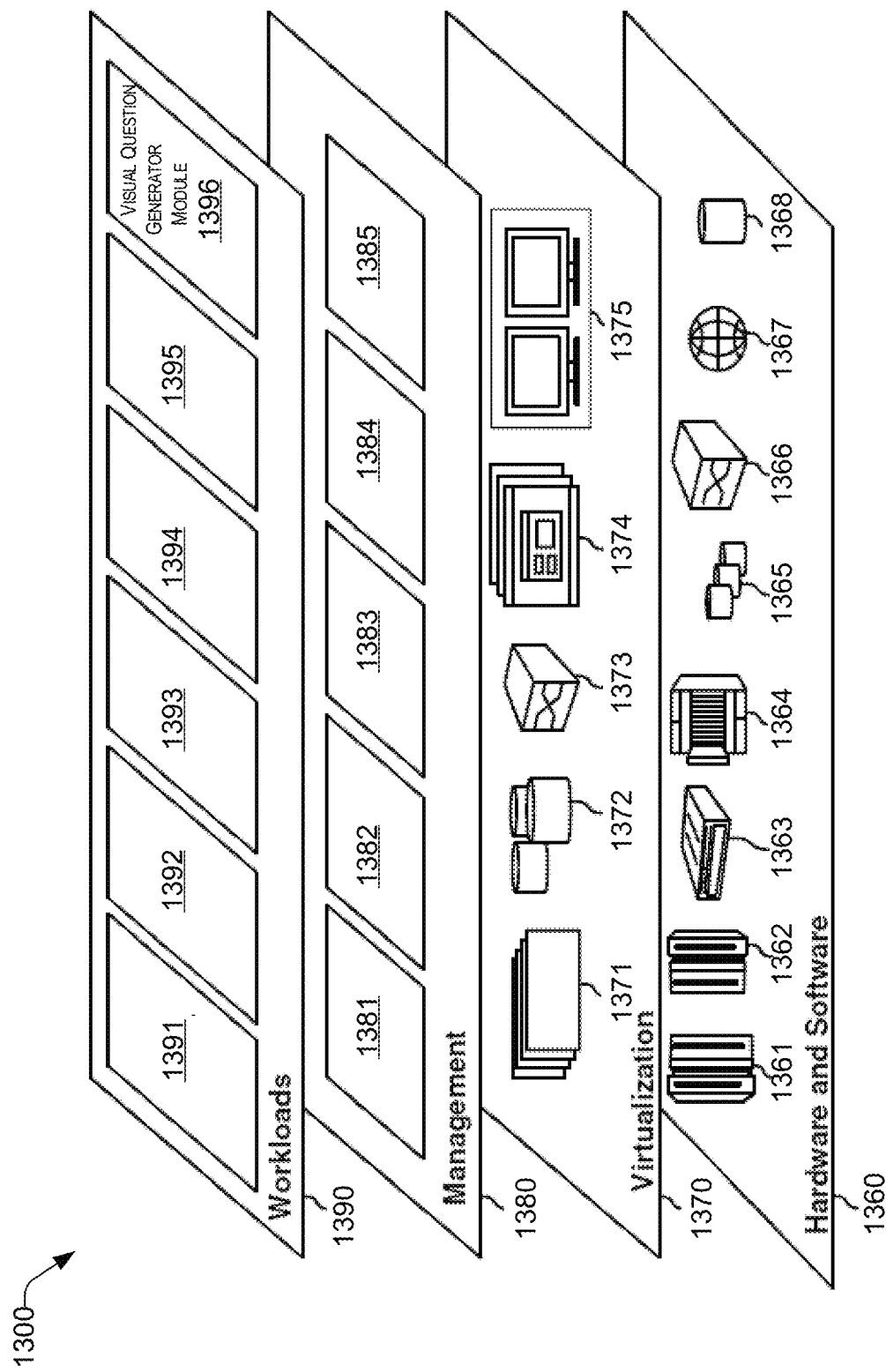
FIG. 13 depicts a set of functional abstraction layers provided by a cloud computing environment, consistent with an illustrative embodiment.

Referring now to FIG. 13, a set of functional abstraction layers 1300 provided by cloud computing environment 1200 (FIG. 12) is shown. It should be understood in advance that the components, layers, and functions shown in FIG. 13 are intended to be illustrative only and embodiments of the disclosure are not limited thereto. As depicted, the following layers and corresponding functions are provided:

Hardware and software layer 1360 include hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Examples of workloads and functions which may be provided from this layer include: mapping and navigation 1391; software development and lifecycle management 1392; virtual classroom education delivery 1393; data analytics processing 1394; transaction processing 1395; and a Visual Question Generator module 1396 configured to generate visual questions using dual hints to improve the accuracy of the questions regarding an image, as discussed herein above.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for visual question generation, the method comprising:
   training an alignment module to analyze an image, an answer hint, and a visual hint with respect to the image;
   constructing a graph of nodes representing objects in the image by performing an aligned embedding for each region of the image, the graph including edges connecting the nodes, the edges indicating relationships amongst the objects of the image, the constructing the graph of nodes comprising performing a double hint cross-modal operation:
   with a gating function to weaken the answer hint irrelevant regions and
   to enhance alignment between visual and textual hints, wherein the double hint cross-modal operation comprises:
      performing a visual hint alignment by aligning one or more regions R of the image with one or more region hints $R_{gt}$;
      calculating an intersection over union between R and $R_{gt}$;
      determining whether a particular region $r_i$ is positive based on its intersection over union among any of the one or more region hints $R_{gt}$ being larger than a predetermined threshold θ; and
      projecting the particular region ri to an embedding space,
   wherein the constructing the graph of nodes further comprises inputting the aligned embeddings into a graph neural network; and
   generating a visual question by sequence decoding the image and the graph of nodes.

2. The computer-implemented method of claim 1, further comprising generating the visual question, the answer hint, and the visual hint using a Graph2Seq model.

3. The computer-implemented method of claim 2, further comprising:
   applying by a residual network (ResNet) the image attention; and
   applying the graph attention to the graph by an object detection model using a mask regional convolutional neural network (Mask RCNN).

4. The computer-implemented method of claim 1, wherein the sequence decoding comprises applying an image attention to the image and a graph attention to the graph, respectively.

5. The computer-implemented method of claim 1, wherein performing the double hint cross-modal alignment operation encodes a component that is output to an embedding space.

6. The computer-implemented method of claim 1, wherein the generating of the visual question further includes generating a side information comprising an answer to the visual question.

7. The computer-implemented method of claim 1, further comprising:
   using a natural language processing tool to identify a noun-phrase in the visual question and an answer; and
   aligning the noun-phrase with an object in the image.

8. The computer-implemented method of claim 1, further comprising providing the generated visual question to a machine learning model.

9. The computer-implemented method of claim 1, further comprising using feature aggregation to construct the graph.

10. The computer-implemented method of claim 1, wherein the graph is a k-nearest neighbor (KNN) graph.

11. A computing device for visual question generation, comprising:
    a processor;
    a memory coupled to the processor, the memory storing instructions to cause the processor to perform acts comprising:
       training an alignment module to analyze an image, an answer hint, and a visual hint with respect to the image;
       constructing a graph of nodes representing objects in the image by performing an aligned embedding for each region of the image, the graph including edges connecting the nodes, the edges indicating relationships amongst the objects of the image, the constructing the graph of nodes comprising performing a double hint cross-modal alignment operation:
       with a gating function to weaken the answer hint irrelevant regions and
       to enhance alignment between visual and textual hints, wherein the double hint cross-modal operation comprises:
          performing a visual hint alignment by aligning one or more regions R of the image with one or more region hints $R_{gt}$;
          calculating an intersection over union between R and $R_{gt}$;
          determining whether a particular region $r_i$ is positive based on its intersection over union among any of the one or more region hints $R_{gt}$ being larger than a predetermined threshold θ; and
          projecting the particular region $r_i$ to an embedding space, wherein the constructing the graph of nodes further comprises inputting the aligned embeddings into a graph neural network ; and generating a visual question by sequence decoding the image and the graph of nodes.

12. The computing device of claim 11, wherein the instructions cause the processor to perform an additional act comprising:

generating the visual question, the answer hint, and the visual hint using a Graph2Seq model.

13. The computing device claim 11, wherein the sequence decoding comprises applying an image attention to the image, and a graph attention to the graph, respectively.

14. The computing device of claim 11, wherein the double hint cross-modal alignment operation encodes a component that is output to an embedding space.

15. The computing device of claim 11, wherein the instructions cause the processor to perform additional acts comprising:

using a natural language processing tool to identify a noun-phrase in the visual question and an answer; and aligning the nounphrase with an object in the image.

16. The computing device of claim 11, wherein the instructions cause the processor to perform an additional act comprising:

instructing a multi-task decoder to process one or more images using the generated visual question.

17. The computing device of claim 16, wherein the one or more images processed by the multi-task decoder includes raw images.

18. A non-transitory computer-readable storage medium tangibly embodying a computer-readable program code having computer-readable instructions that, when executed, causes a computer device to perform a method for visual question generation, the method comprising:

training an alignment module to analyze an image, an answer hint, and a visual hint with respect to the image;

constructing a graph of nodes representing objects in the image by performing an aligned embedding for each region of the image, the graph including edges connecting the nodes, the edges indicating relationships amongst the objects of the image, the constructing the graph of nodes comprising a double hint cross-modal alignment operation:

with a gating function to weaken the answer hint irrelevant regions and to enhance alignment between visual and textual hints, wherein the double hint cross-modal operation comprises:

performing a visual hint alignment by aligning one or more regions R of the image with one or more region hints $R_{gt}$;

calculating an intersection over union between R and $R_{gt}$;

determining whether a particular region $r_i$ is positive based on its intersection over union among any of the one or more region hints $R_{gt}$ being larger than a predetermined threshold $\theta$; and projecting the particular region ri to an embedding space, wherein the constructing the graph of nodes further comprises inputting the aligned embeddings into a graph neural network; and generating a visual question by sequence decoding the image and the graph of nodes.

19. The non-transitory computer-readable storage medium of claim 18, further comprising computer-readable instructions that, when executed, cause the computer device to perform an additional act comprising:

generating the visual question, the answer hint, and the visual hint using a Graph2Seq model.

* * * * *